United States Patent
Sato et al.

(10) Patent No.: US 9,216,725 B2
(45) Date of Patent: Dec. 22, 2015

(54) CONTROL APPARATUS FOR HYBRID VEHICLE

(71) Applicants: Daiki Sato, Toyota (JP); Tetsuo Hori, Toyota (JP)

(72) Inventors: Daiki Sato, Toyota (JP); Tetsuo Hori, Toyota (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 14/222,978

(22) Filed: Mar. 24, 2014

(65) Prior Publication Data

US 2014/0290225 A1    Oct. 2, 2014

(30) Foreign Application Priority Data

Mar. 26, 2013   (JP) ................. 2013-064361

(51) Int. Cl.
| | | |
|---|---|---|
| *F01N 3/00* | (2006.01) | |
| *B60W 10/06* | (2006.01) | |
| *F02D 41/02* | (2006.01) | |
| *B60W 20/00* | (2006.01) | |
| *B60K 6/445* | (2007.10) | |
| *F01N 3/08* | (2006.01) | |

(52) U.S. Cl.
CPC ........... *B60W 10/06* (2013.01); *B60W 20/1082* (2013.01); *F02D 41/0275* (2013.01); *B60K 6/445* (2013.01); *B60W 2510/083* (2013.10); *B60W 2710/0622* (2013.01); *F01N 3/0842* (2013.01); *F02D 2250/24* (2013.01)

(58) Field of Classification Search
CPC ..... F02D 41/029; F01N 3/0842; F01N 3/035; F01N 13/02; B60W 20/00; Y02T 10/62; B60K 6/44; B60K 6/445

USPC ............... 60/285, 286, 295, 301; 180/65.225, 180/65.235; 701/22
See application file for complete search history.

(56) References Cited

U.S. PATENT DOCUMENTS

| | | | |
|---|---|---|---|
| 6,237,329 | B1 | 5/2001 | Mizuno |
| 2001/0037905 | A1* | 11/2001 | Nogi et al. .................. 180/65.2 |
| 2006/0173590 | A1* | 8/2006 | Zillmer et al. .................. 701/22 |
| 2006/0270519 | A1* | 11/2006 | Kamada et al. .................. 477/3 |
| 2009/0043437 | A1* | 2/2009 | Shiino .............................. 701/22 |
| 2009/0227407 | A1* | 9/2009 | Kamada et al. .................. 475/5 |

FOREIGN PATENT DOCUMENTS

| | | |
|---|---|---|
| JP | 11-190241 A | 7/1999 |
| JP | 2005-351381 A | 12/2005 |
| JP | 2006-257947 A | 9/2006 |
| JP | 2006-262585 A | 9/2006 |
| JP | 2006256607 A | 9/2006 |

* cited by examiner

*Primary Examiner* — Patrick Maines
(74) *Attorney, Agent, or Firm* — Sughrue Mion, PLLC

(57) ABSTRACT

A control apparatus for a hybrid vehicle includes an engine, an exhaust gas purification catalyst, a first motor-generator, an output section, a differential mechanism, a second motor-generator, and a controller. The output section is configured to transfer torque to driving wheels of the hybrid vehicle. The differential mechanism is configured to distribute the torque from the engine to the first motor-generator and the output section. The second motor-generator is connected to the output section through gears. The controller is configured to: (a) execute a temporarily changing the air-fuel ratio of the engine to a rich side as a rich spike operation when a specified condition is satisfied, and (b) set the specified condition so that the rich spike operation is easily executed as a motor torque of the second motor-generator increases.

2 Claims, 8 Drawing Sheets

FUEL EFFICIENCY EMPHASIS TYPE

| ELECTRIC STORAGE RATE | MOTOR TORQUE OF SECOND MOTOR-GENERATOR | |
|---|---|---|
| | NEGATIVE (MOTOR TORQUE < 0) | POSITIVE (MOTOR TORQUE ≥ 0) |
| NEAR UPPER LIMIT | PATTERN C - ENGINE TORQUE INCREASE SIDE | PATTERN A - ENGINE TORQUE DECREASE SIDE |
| NORMAL | PATTERN A - ENGINE TORQUE INCREASE SIDE | PATTERN A - ENGINE TORQUE DECREASE SIDE |
| NEAR LOWER LIMIT | PATTERN A - ENGINE TORQUE INCREASE SIDE | PATTERN C - ENGINE TORQUE DECREASE SIDE |

FIG. 8

DRIVABILITY EMPHASIS TYPE

| ELECTRIC STORAGE RATE | MOTOR TORQUE OF SECOND MOTOR-GENERATOR | |
|---|---|---|
| | NEGATIVE (MOTOR TORQUE < 0) | POSITIVE (MOTOR TORQUE ≥ 0) |
| NEAR UPPER LIMIT | PATTERN C - ENGINE TORQUE INCREASE SIDE | PATTERN B - ENGINE TORQUE DECREASE SIDE |
| NORMAL | PATTERN B - ENGINE TORQUE INCREASE SIDE | PATTERN B - ENGINE TORQUE DECREASE SIDE |
| NEAR LOWER LIMIT | PATTERN B - ENGINE TORQUE INCREASE SIDE | PATTERN C - ENGINE TORQUE DECREASE SIDE |

CONTROL APPARATUS FOR HYBRID VEHICLE

INCORPORATION BY REFERENCE

The disclosure of Japanese Patent Application No. 2013-064361 filed on Mar. 26, 2013 including the specification, drawings and abstract is incorporated herein by reference in its entirety.

BACKGROUND OF THE INVENTION

1. Field of the Invention

The present invention relates to a control apparatus that is applied to a hybrid vehicle equipped with an engine in which an air-fuel ratio can be changed.

2. Description of Related Art

An engine that can execute lean combustion in which a target air-fuel ratio of the engine is set to a lean side in comparison with a theoretical air-fuel ratio has been well known in the art. Such an engine is equipped with an exhaust gas purification catalyst of an absorbing and reduction type for purifying nitrogen oxides in exhaust gas that is discharged due to the lean combustion. When the concentration of the nitrogen oxides absorbed in the exhaust gas purification catalyst exceeds a limit, the exhaust gas purifying capability reduces. Thus, a rich spike operation in which the air-fuel ratio is temporarily changed to a rich side is executed. Consequently, the nitrogen oxides absorbed in the exhaust gas purification catalyst are reduced, and the exhaust gas purifying capability of the exhaust gas purification catalyst is regained.

The rich spike operation involves the increase in the amount of fuel and thereby causes torque fluctuation of the engine. Japanese Patent Application Publication No. 11-190241 (JP 11-190241 A) discloses a control apparatus that corrects throttle opening during the rich spike operation in order to reduce the torque fluctuation.

SUMMARY OF THE INVENTION

Incidentally, a hybrid vehicle is known in which engine power is divided to a first motor-generator and an output section and a second motor-generator is connected to the output section through gears. This kind of hybrid vehicle loses push force against the output section of a gear interposed between the output section and the second motor-generator when the torque of the second motor-generator reaches about 0 Nm torque. As a result, the torque fluctuation of the engine is transmitted to the output section, and thus the output section and the gear collide against each other between a backlash to make gear tooth striking noise.

When such an engine capable of lean combustion as described above is installed in the hybrid vehicle, the torque fluctuation caused by the rich spike operation cannot be eliminated completely even if the torque fluctuation is reduced by the correction of the throttle opening. Consequently, the gear tooth striking noise associated with the rich spike operation may occur in a range where the torque of the second motor-generator is small.

The object of the present invention is to provide a control apparatus for a hybrid vehicle that can prevent the gear tooth striking noise associated with the rich spike operation from occurring.

A control apparatus for a hybrid vehicle according to an aspect of the present invention, the control apparatus includes an engine, an exhaust gas purification catalyst, a first motor-generator, an output section, a differential mechanism, a second motor-generator, and a controller. the engine is configured to change a combustion air-fuel ratio. The exhaust gas purification catalyst is configured to absorb and reduce nitrogen oxides in exhaust gas of the engine. The output section is configured to transfer torque to driving wheels of the hybrid vehicle. The differential mechanism is configured to distribute the torque from the engine to the first motor-generator and the output section. The second motor-generator is connected to the output section through gears. The controller is configured to: (a) execute a temporarily changing the air-fuel ratio of the engine to a rich side as a rich spike operation when a specified condition is satisfied, and (b) set the specified condition so that the rich spike operation is easily executed as a motor torque of the second motor-generator increases.

According to the control apparatus, one requirement for satisfying the specified condition of the rich spike operation includes the motor torque of the second motor-generator, and thus the rich spike operation can be prevented from being executed under a condition that the gear tooth striking noise easily occurs. Consequently, the gear tooth striking noise associated with the rich spike operation can be prevented from occurring. Additionally, the gear tooth striking noise hardly occurs as the motor torque of the second motor-generator increases. Therefore, the specified condition is determined such that the rich spike operation is easily executed as the motor torque of the second motor-generator increases, and accordingly the rich spike operation is executed actively under the condition that the gear tooth striking noise hardly occurs. As a result, an execution period of the lean combustion can be extended.

The control apparatus according to the aspect of the present invention described above is in which the specified condition may include a first condition, and a second condition. The first condition is a condition that the motor torque of the second motor-generator deviates from a rich spike prohibition torque range including 0 Nm torque. The second condition is a condition that a nitrogen oxide concentration of the exhaust gas purification catalyst exceeds a threshold. The controller is configured to change an operating point of the engine so that the motor torque of the second motor-generator deviates from the rich spike prohibition torque range when the first condition and the second condition are satisfied. In this case, it is not necessary to wait for deviation of the magnitude of motor torque of the second motor-generator from the rich spike prohibition range in the course of the event. The magnitude of motor torque of the second motor-generator actively deviates from the rich spike prohibition range by the change of the operating point of the engine. Therefore, circumstances that the rich spike operation can be executed can be made immediately.

The control apparatus for a hybrid vehicle according to an aspect of the present invention may further include a battery electrically connected to the second motor-generator, in which the controller may be configured to change a pattern for changing the operating point of the engine in accordance with an electric storage rate of the battery and a sign, positive or a negative, of the motor torque of the second motor-generator. In this case, the patterns for changing the operating point of the engine are changed in accordance with the electric storage rate of the battery and a sign, positive or negative, of the motor torque, and thus deficiency and excess of the electric storage rate of the battery associated with the change of the operating point of the engine can be prevented.

As described above, according to the present invention, the requirement for satisfying the specified condition of the rich spike operation includes the motor torque of the second motor-generator, and thus the rich spike operation can be prevented from being executed under a condition that the gear tooth striking noise easily occurs.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
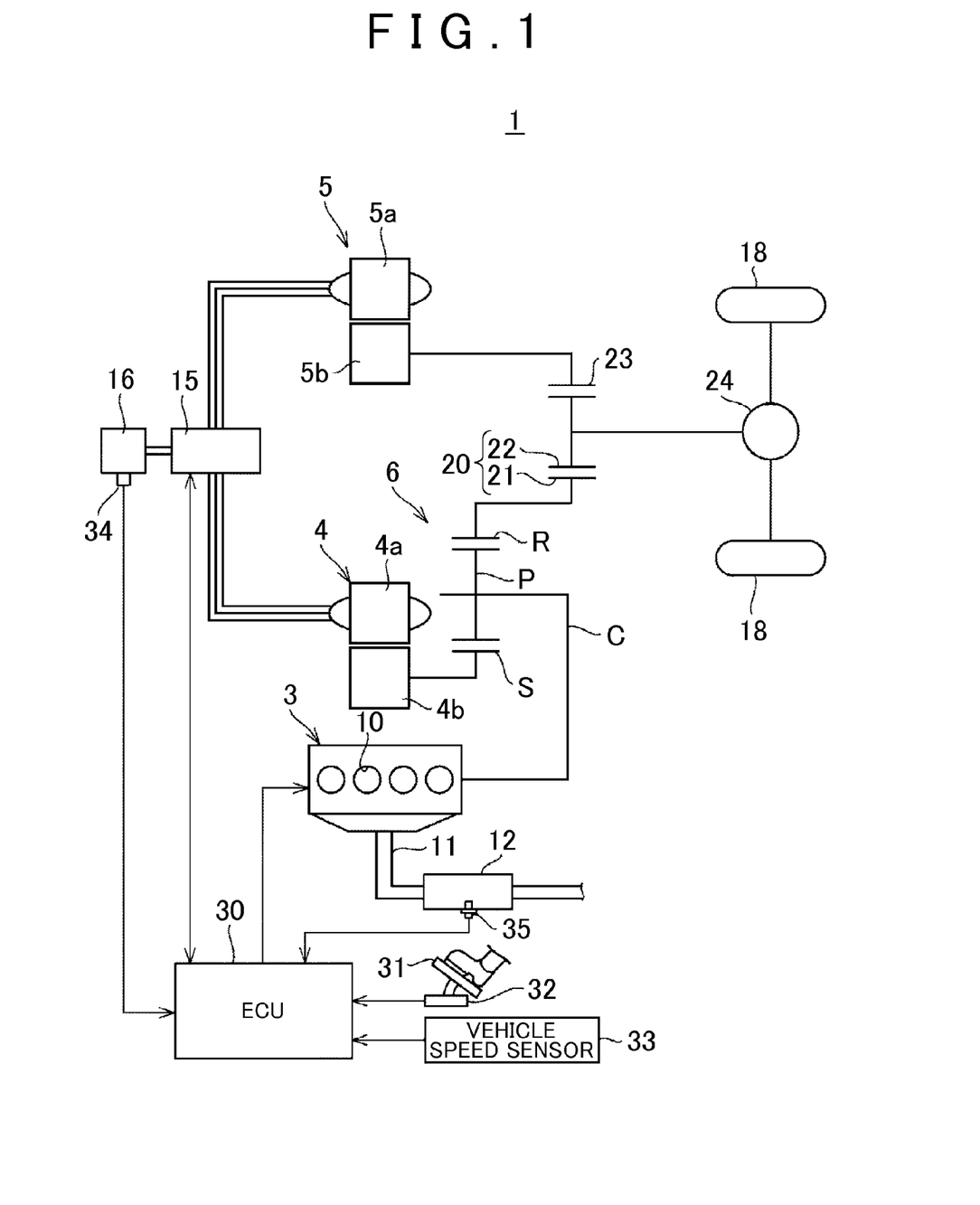
FIG. 1 is a diagram that shows an overall structure of a vehicle to which a control apparatus according to a first embodiment of the present invention is applied.

Hereinafter, embodiments according to the present invention will be described in detail with reference to attached drawings. A first embodiment according to the present invention is described at the start. As shown in FIG. 1, a vehicle 1 is constructed as a hybrid vehicle in which a plurality of power sources are combined. The vehicle 1 includes an engine 3 and two motor-generators, a first motor-generator 4 and a second motor-generator 5, as the power sources for driving the vehicle. The engine 3 is constructed as an in-line 4-cylinder internal combustion engine that includes four cylinders 10. The air-fuel ratio of the engine 3 is variable, and the engine 3 is constructed as a lean-burn engine capable of lean combustion in which a target air-fuel ratio is set to a lean side in comparison with theoretical air-fuel ratio. The exhaust gas discharged from the engine 3 is led to an exhaust passage 11. Toxic substances in the exhaust gas such as nitrogen oxides (NOx) are purified by an exhaust gas purification catalyst 12. The exhaust gas purification catalyst 12 is constructed as a known NOx absorbing and reduction type catalyst that absorbs and reduces NOx in the exhaust gases.

The engine 3 and the first motor-generator 4 are connected to a power dividing mechanism 6 as a differential mechanism. The first motor-generator 4 includes a stator 4a and a rotor 4b. The first motor-generator 4 operates as a generator that generates electric power by receiving driving power of the engine 3 distributed by the power dividing mechanism 6 as well as a motor that is driven by alternating-current (AC) power. Similarly, the second motor-generator 5 includes a stator 5a and a rotor 5b and operates as the motor and the generator. The first motor-generator 4 and the second motor-generator 5 are connected to a battery 16 through a motor control unit 15. The motor control unit 15 converts the electric power generated by the first motor-generator 4 or the second motor-generator 5 to direct-current (DC) power to store it in the battery 16 and also converts the electric power stored in the battery 16 to AC power to supply it to the first motor-generator 4 and the second motor-generator 5.

The power dividing mechanism 6 is constructed as a single-pinion type planetary gear mechanism. The power dividing mechanism 6 includes a sun gear S that is an external gear, a ring gear R that is an internal gear disposed coaxially with the sun gear S, and a planetary carrier C that holds pinions P meshing with the gears S and R for rotation and revolution. Engine torque produced by the engine 3 is transferred to the planetary carrier C of the power dividing mechanism 6. The rotor 4b of the first motor-generator 4 is connected to the sun gear S of the power dividing mechanism 6. The torque output from the power dividing mechanism 6 through the ring gear R is transferred to an output gear train 20. The output gear train 20 operates as an output section for transferring the torque to driving wheels 18. The output gear train 20 includes an output drive gear 21 that rotates together with the ring gear R of the power dividing mechanism 6 and an output driven gear 22 that meshes with the output drive gear 21. The output driven gear 22 is connected to the second motor-generator 5 through a gear 23. In other words, the second motor-generator 5 is connected to the output gear train 20 as the output section through the gear 23. The gear 23 rotates together with the rotor 5b of the second motor-generator 5. The torque output from the output driven gear 22 is distributed to the right and the left driving wheels 18 through a differential gear 24.

The power dividing mechanism 6 is provided with a motor lock mechanism 25 as lock means. The motor lock mechanism 25 can change the state of the power dividing mechanism 6 between a differential state in which the torque of the engine 3 is distributed to the first motor-generator 4 and the output gear train 20 and a non-differential state in which the distribution of the torque is stopped. The motor lock mechanism 25 is constructed as a brake mechanism of wet multiple disc type. The motor lock mechanism 25 changes its state between an engaging state in which the rotation of the rotor 4b of the first motor-generator 4 is prevented and a releasing state in which the rotation of the rotor 4b is allowed. The engaging state and the releasing state of the motor lock mechanism 25 are changed by a hydraulic actuator (not shown). When the motor lock mechanism 25 is operated to be in the engaging state, the rotation of the rotor 4b of the first motor-generator 4 is prevented. Thus, the rotation of the sun gear S of the power dividing mechanism 6 can be prevented. Consequently, the distribution of the torque of the engine 3 to the first motor-generator 4 is stopped, and the state of the power dividing mechanism 6 becomes the non-differential state.

Each component of the vehicle 1 is controlled by an electronic control unit (ECU) 30 that is configured as a computer. The ECU 30 performs various controls for the first motor-generator 4 and the second motor-generator 5, the motor lock mechanism 25, and other components. Hereinafter, main controls executed by the ECU 30 in relation to the present invention will be described. The ECU 30 receives various information of the vehicle 1. For example, the ECU 30 receives the rotation speed and the torque of the first motor-generator 4 and the second motor-generator 5 through the motor control unit 15. Additionally, the ECU 30 receives an output signal from an accelerator operation amount sensor 32 that outputs a signal in response to a depressing amount of an accelerator pedal 31, an output signal from a vehicle speed sensor 33 that outputs a signal in response to the speed of the vehicle 1, an output signal from a state-of-charge (SOC) sensor 34 that outputs a signal in response to an electric storage rate of the battery 16, and an output signal from a temperature sensor 35 that outputs a signal in response to the temperature of the exhaust gas purification catalyst 12.

The ECU 30 calculates a required drive force that is required by a driver by reference to the output signal from the accelerator operation amount sensor 32 and the output signal from the vehicle speed sensor 33 and controls the vehicle 1 while changing various modes so as to obtain optimum system efficiency for the required drive force. For example, in a low-load range where the thermal efficiency of the engine 3 decreases, an EV mode is selected in which the combustion of the engine 3 is stopped and the second motor-generator 5 is driven. When the torque is insufficient with the engine 3 only, a hybrid mode is selected in which the second motor-generator 5 is used as a driving source for travel along with the engine 3.

Figure 2:
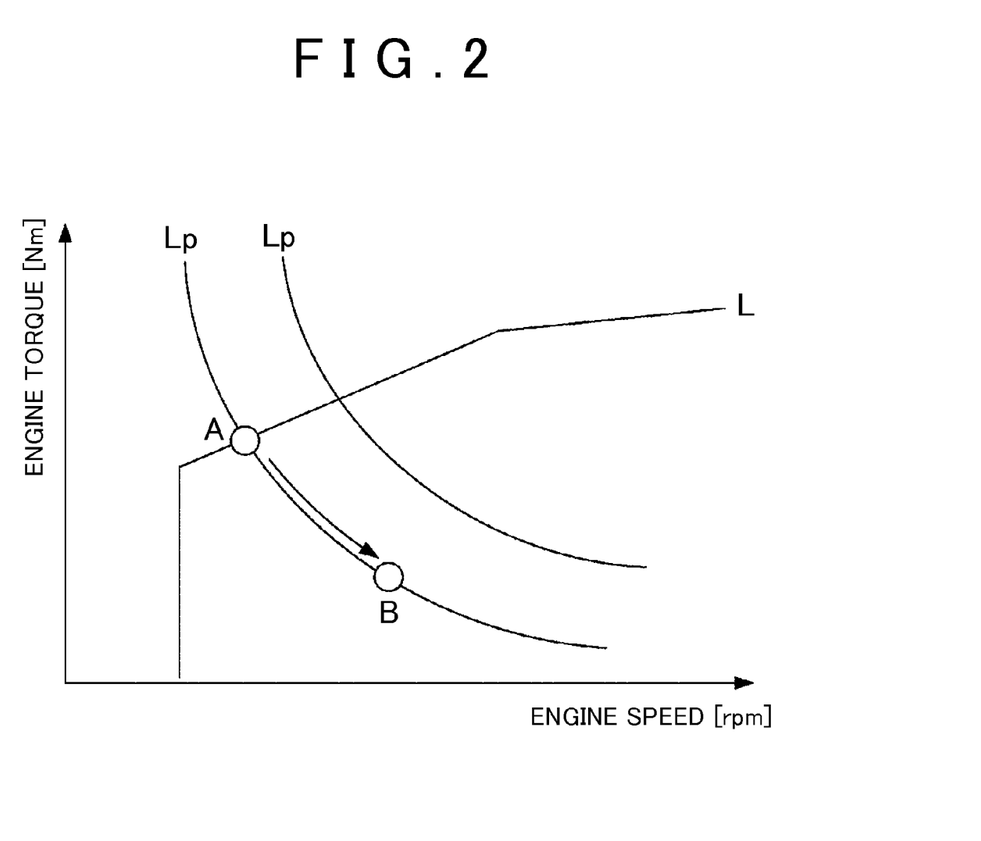
FIG. 2 is a chart that illustrates an operating point of an engine in a hybrid mode according to the first embodiment of the present invention.

When the hybrid mode is selected, the required drive force is output in accordance with the sum of engine torque of the engine 3 and motor torque of the second motor-generator 5. In other words, when the engine torque is assumed to be Te and the motor torque is assumed to be Tm, the required drive force Td is defined by Td=Te+Tm. As shown in FIG. 2, the engine 3 is controlled by the ECU 30 such that the operating point defined by the engine speed and the engine torque moves on a normal line L specified in advance. The normal line L is specified in advance by a simulation or a test with actual equipment so that the optimum fuel efficiency of the engine 3 can be achieved and the noise can be reduced. When most of the required drive force can be provided by the engine torque, the motor torque becomes a small value that is about 0 Nm torque. In such a case, the push force of the gear 23 connected to the second motor-generator 5 and the output driven gear 22 against each other decreases. Thus, the fluctuation of the engine speed or the engine torque on the internal combustion engine 3 is transmitted to the output driven gear 22. As a result, the gear 23 and the output driven gear 22 collide against each other between a backlash, and the noise such as gear tooth striking noise may occur in a power transmission system.

As described above, although the engine 3 is capable of lean combustion, NOx is gradually absorbed in the exhaust gas purification catalyst 12 during the lean combustion, and the exhaust gas purifying capability reduces when the absorption amount reaches the limit. Thus, a rich spike operation is executed by the ECU 30 in order to regain the exhaust gas purifying capability by reducing NOx to reduce the absorption amount of NOx absorbed in the exhaust gas purification catalyst 12. The rich spike operation is a well-known control for temporarily changing the air-fuel ratio to a rich side. The rich spike operation involves the increase in the amount of fuel during the process in which the air-fuel ratio changes to the rich side, and thus the torque fluctuation of the engine 3 may occur. If such a torque fluctuation occurs when the motor torque of the second motor-generator 5 is a small value about 0 Nm torque, gear tooth striking noise may occur.

In order to prevent the occurrence of the gear tooth striking noise caused by the rich spike operation, the ECU 30 then restricts the execution of the rich spike operation in the present embodiment when the motor torque of the second motor-generator 5 is a small value about 0 Nm torque as a first condition. That is to say, the ECU 30 determines that the specified condition for the rich spike operation is not satisfied when the motor torque of the second motor-generator 5 is a small value about 0 Nm torque. In other words, one requirement for satisfying the specified condition includes the motor torque of the second motor-generator 5, and when the motor torque is within the range of prohibition on the rich spike operation, that is, at a small value about 0 Nm torque, the execution of the rich spike operation is restricted.

Figure 3:
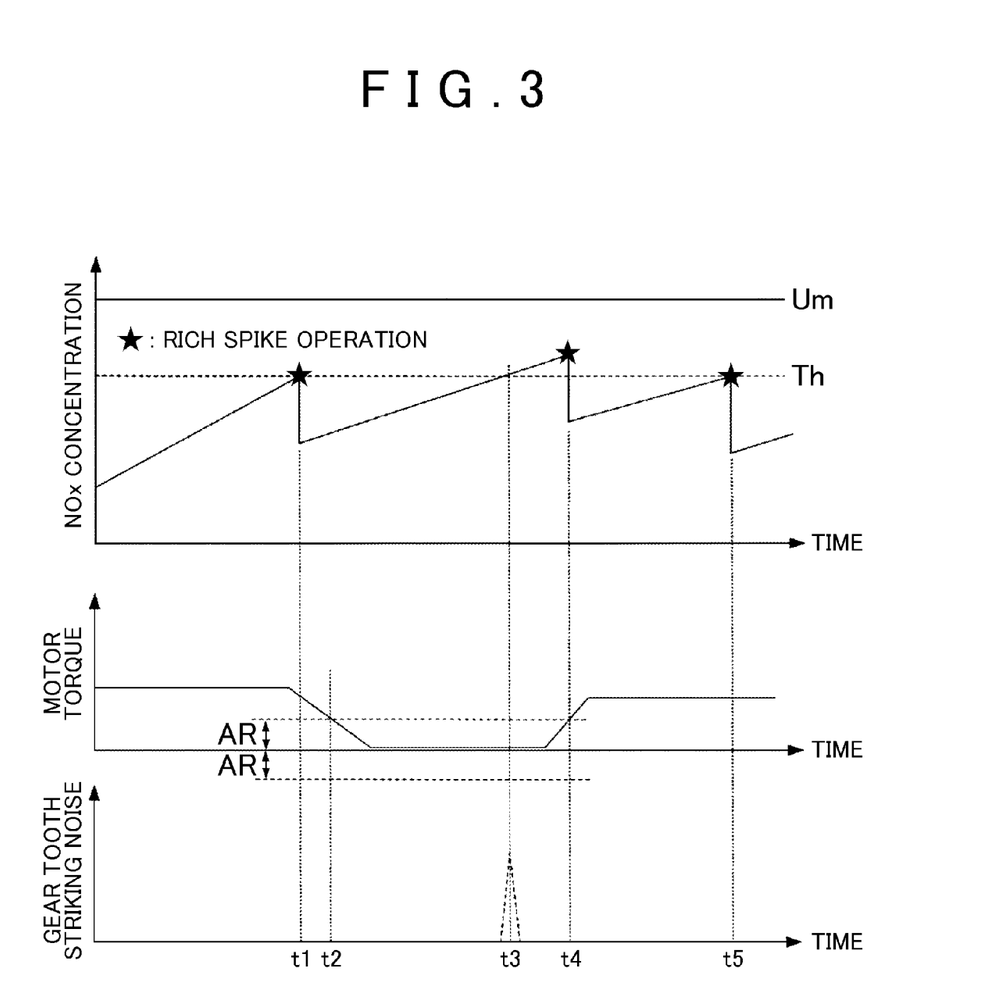
FIG. 3 is time charts that show one example of a control result according to the first embodiment of the present invention.

As shown in FIG. 3, when the engine 3 conducts the lean combustion, the exhaust gas purification catalyst 12 continues to absorb NOx in the exhaust gas, and a NOx concentration of the exhaust gas purification catalyst 12, that is, the ratio of the NOx absorption amount against the absorption limit thus gradually increases. At time t1, the NOx concentration exceeds a threshold Th as a second condition, and the motor torque of the second motor-generator 5 deviates from a rich spike prohibition range AR including 0 Nm torque as the first condition. Thus, the rich spike operation is executed. In other words, in the first embodiment of the present invention, the NOx concentration exceeding the threshold Th as the second condition and the motor torque of the second motor-generator 5 deviating from the rich spike prohibition range AR as the first condition are determined as the requirements for satisfying the specified condition of the rich spike operation. The threshold Th is a value smaller than an upper allowable limit value Urn of the NOx concentration that is usually used in the rich spike operation. Consequently, the rich spike operation in the present embodiment is executed with a lower NOx concentration than a normal operation, and the motor torque falls within the rich spike prohibition range AR. Therefore, there is enough time for the NOx concentration to reach the upper allowable limit value Urn even when the execution of the rich spike operation is restricted as described below. When the rich spike operation is executed at the time t1, the NOx concentration instantaneously drops and then increases again.

During a period between time t2 and time t4, the motor torque of the second motor-generator 5 falls within the rich spike prohibition range AR, and thus the execution of the rich spike operation is restricted. Consequently, even when the NOx concentration reaches the threshold Th at time t3, the rich spike operation is not executed. If the rich spike operation is executed at the time t3, the gear tooth striking noise occurs between the gears 22 and 23 due to the torque fluctuation of the engine 3 as shown with broken lines.

The motor torque subsequently deviates from the rich spike prohibition range AR at time t4, thus both of the first condition and the second condition described above are satisfied, and the specified condition of the rich spike operation is satisfied. The rich spike operation is executed accordingly. Then, the rich spike operation is similarly executed at time t5.

As described above, when the motor torque of the second motor-generator 5 falls within the rich spike prohibition range AR, the execution of the rich spike operation is restricted. Thus, the gear tooth striking noise can be prevented from occurring. The rich spike prohibition range AR may be determined appropriately. Thus, the ECU 30 set the specified condition so that the rich spike operation is easier to execute as the motor torque of the second motor-generator 5 increases.

Figure 4:
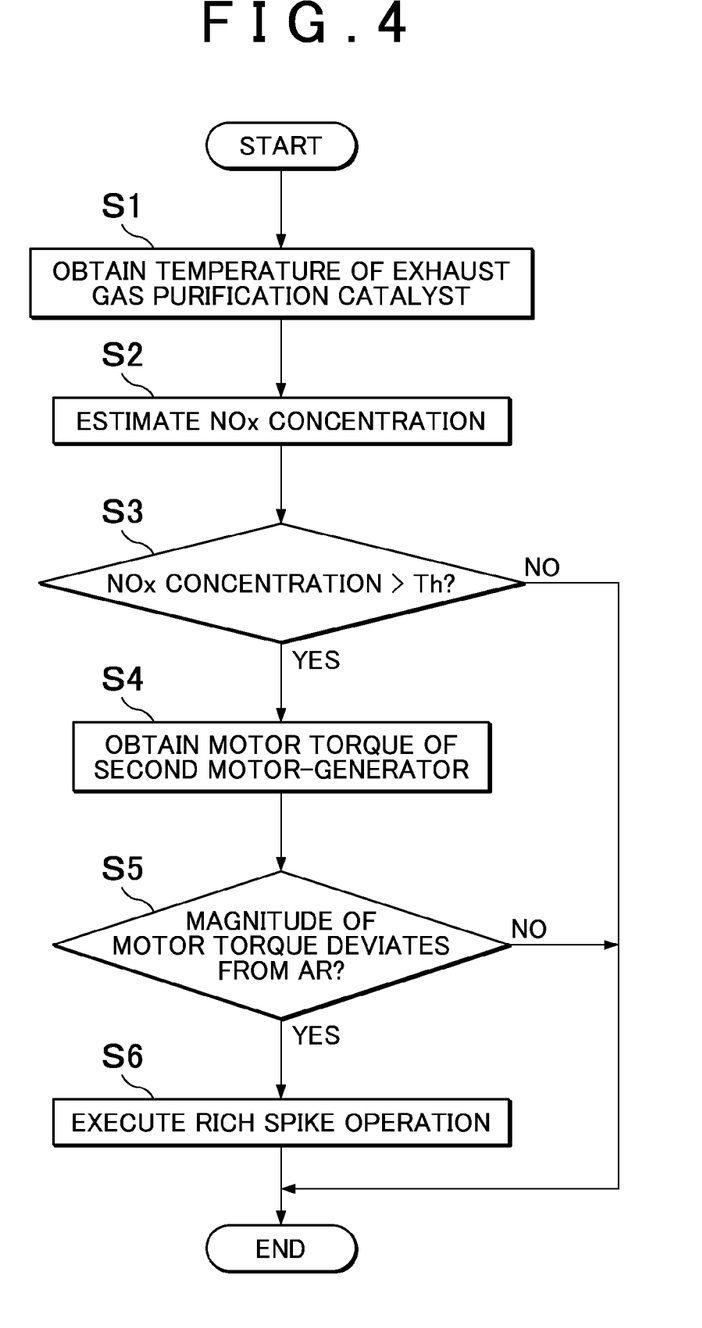
FIG. 4 is a flowchart that shows one example of a control routine according to the first embodiment of the present invention.

The controls described above can be achieved by the ECU 30 executing a control routine shown in FIG. 4. A program for the control routine shown in FIG. 4 is stored in the ECU 30 and appropriately read out to be executed at specified intervals. In step S1, the ECU 30 obtains the temperature of the exhaust gas purification catalyst 12 in accordance with the signal from the temperature sensor 35. In step S2, the ECU 30 estimates the NOx concentration of the exhaust gas purification catalyst 12. The estimation can be implemented by a known or publicly known method. For example, the ECU 30 calculates a total flow rate of the exhaust gases during the period in which the lean combustion is executed after the execution of the rich spike operation and estimates the NOx concentration based on the calculated total flow rate and the temperature of the exhaust gas purification catalyst 12 obtained in the step S1.

In step S3, the ECU 30 determines whether or not the NOx concentration exceeds the threshold Th. When the NOx concentration exceeds the threshold Th as the second condition, the process proceeds with step S4. When the NOx concentration does not exceed the threshold Th, subsequent steps are skipped, and the present routine is terminated. In step S4, the ECU 30 obtains the motor torque of the second motor-generator 5 from the motor control unit 15. In step S5, the ECU 30 determines whether or not the motor torque of the second motor-generator 5 deviates from the rich spike prohibition range AR as the first condition. The motor torque is the absolute value of the motor torque. When the motor torque deviates from the rich spike prohibition range AR, the process proceeds with step S6, or otherwise, the subsequent steps are skipped, and the present routine is terminated. In step S6, the ECU 30 temporarily changes the air-fuel ratio of the engine 3 to the rich side and thus executes the rich spike operation.

When the ECU 30 executes the control shown in FIG. 4, the rich spike operation is executed only if both of the first condition and the second condition described above are satisfied.

A second embodiment according to the present invention will be described next with reference to FIG. 5 through FIG. 8. The second embodiment is characterized by the details of the control executed when the NOx concentration exceeds the threshold Th but the motor torque of the second motor-generator 5 falls within the rich spike prohibition range AR. Other details are the same as the first embodiment, and thus their descriptions are not repeated.

In the first embodiment, if the first and second conditions described above are true, the execution of the rich spike operation is delayed in the course of the event until the motor torque of the second motor-generator 5 deviates from the rich spike prohibition range AR. However, depending on the operating conditions of the vehicle 1, the motor torque of the second motor-generator 5 does not deviate from the rich spike prohibition range AR, and the NOx concentration may reach the upper allowable limit value Um. Consequently, the execution of the rich spike operation may be forced in order to comply with the limitation of the exhaust emission. When the rich spike operation is executed under the conditions described above, the gear tooth striking noise cannot be prevented from occurring.

Thus, in the second embodiment, when the NOx concentration exceeds the threshold Th but the motor torque of the second motor-generator 5 falls within the rich spike prohibition range AR, the ECU 30 executes the control that changes the operating point of the engine 3 so that the magnitude of the motor torque deviates from the rich spike prohibition range AR.

Figure 5:
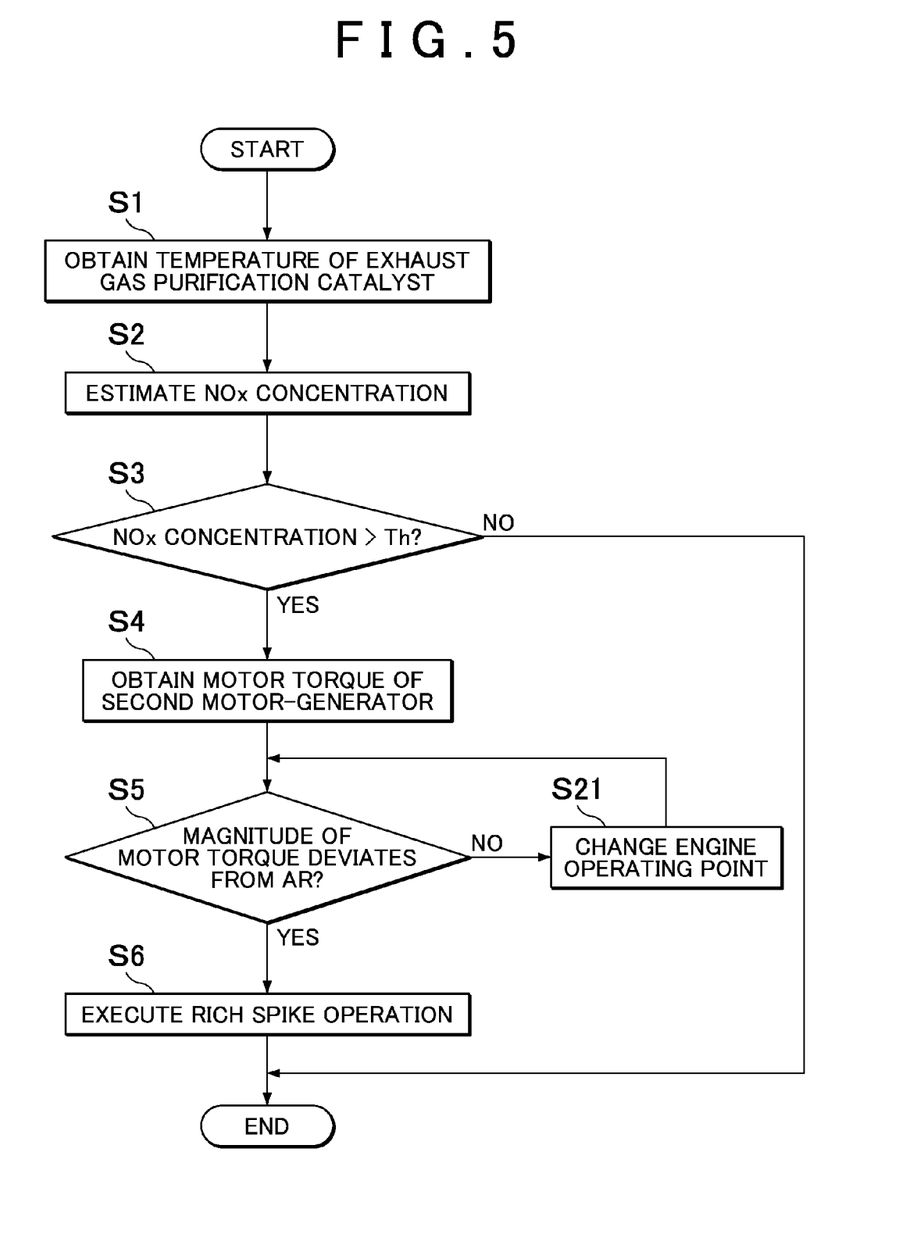
FIG. 5 is a flowchart that shows one example of a control routine according to a second embodiment of the present invention.

FIG. 5 is a flowchart that shows one example of the control routine according to the second embodiment. However, the control routine shown in FIG. 5 corresponds to the control routine according to the first embodiment shown in FIG. 4 to which step S21 is added. Steps S1 through S6 in FIG. 5 are the same processes in the control routine according to the first embodiment, and thus their descriptions are not repeated.

When a negative determination is made in the step S5, that is, when the NOx concentration exceeds the threshold Th but the motor torque of the second motor-generator 5 falls within the rich spike prohibition range AR, the ECU 30 changes the operating point of the engine 3 in the step S21. Consequently, the ECU 30 operates as controller according to the present invention.

Figure 6A:
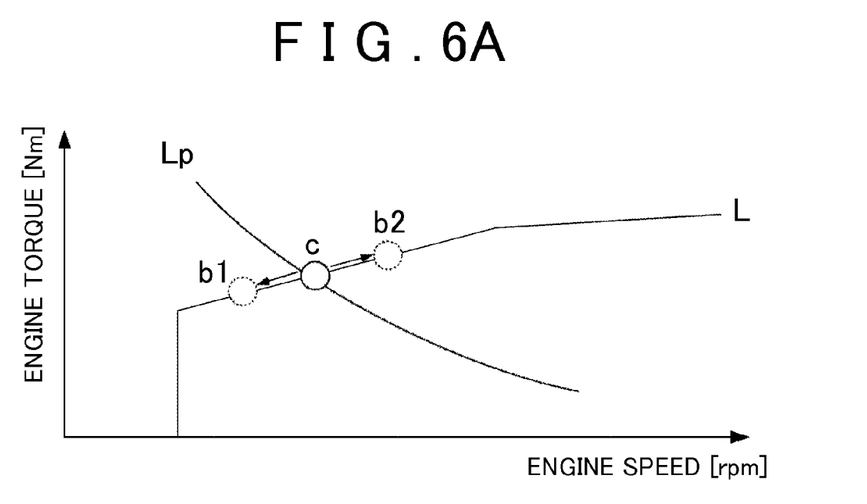
FIG. 6A is a chart that illustrates a pattern A for changing the operating point of the engine according to the second embodiment of the present invention.
Figure 6B:
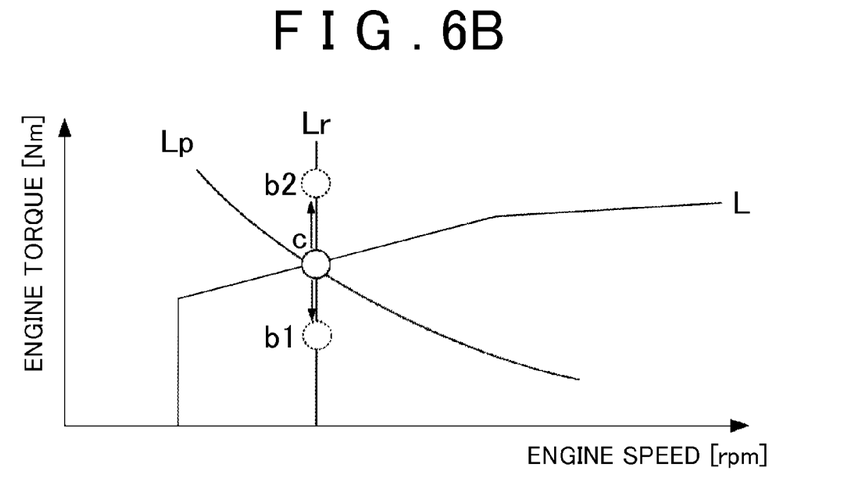
FIG. 6B is a chart that illustrates a pattern B for changing the operating point of the engine according to the second embodiment of the present invention.
Figure 6C:
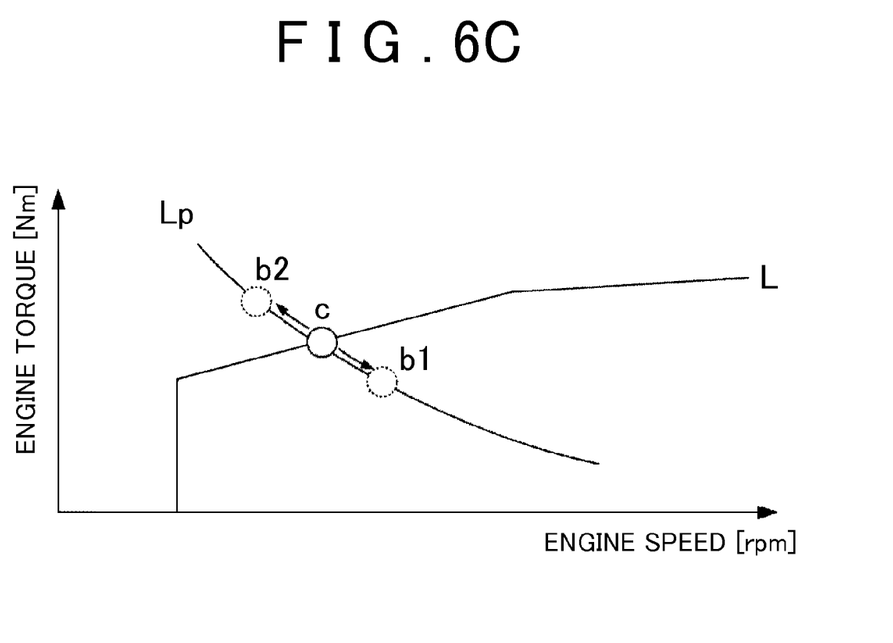
FIG. 6C is a chart that illustrates a pattern C for changing the operating point of the engine according to the second embodiment of the present invention.

The change of the operating point is implemented by changing patterns A, B, and C shown in FIGS. 6A through 6C in accordance with the electric storage rate of the battery 16 and a sign, positive or negative, of the motor torque of the second motor-generator 5. It should be noted that the negative motor torque corresponds to the torque which is transferred from the output section to the second motor-generator 5.

As shown in FIG. 6A, the pattern A is to change the operating point of the engine 3 on the normal line L described above. In other words, the pattern A is to move the operating point of the engine 3 from a point c to a point b1 on a low torque and low engine speed side or a point b2 on a high torque and high engine speed side along the normal line L. A difference from the required drive force caused by the movement of the operating point of the engine 3 is compensated with the motor torque of the second motor-generator 5, and thus the motor torque can be deviated from the rich spike prohibition range AR. In order to prevent the motor torque of the second motor-generator 5 from crossing a zero point, whether to move the operating point to either the point b1 or the point b2 is selected in accordance with the positive or negative motor torque at the point c before the movement. In other words, when the motor torque is greater than or equal to zero at the point c (in the case of positive motor torque), the operating point is moved to the point b1, and when the motor torque is smaller than zero at the point c (in the case of negative motor torque), the operating point is moved to the point b2.

The pattern A is to move the operating point along the normal line L set in consideration of the fuel efficiency of the engine 3, and thus the pattern A can achieve a deviation of the motor torque of the second motor-generator 5 from the rich spike prohibition range AR while preventing deterioration of the fuel efficiency. However, the pattern A involves the fluctuation of the engine speed, and thus the pattern A may provide discomfort to the user. Additionally, the second motor-generator 5 cancels increased or decreased torque that is directly transferred from the engine 3, and thus the pattern A involves the change in the electric storage rate of the battery 16.

As shown in FIG. 6B, the pattern B is to move the operating point of the engine 3 by keeping the engine speed constant and changing only the engine torque. In other words, the pattern B is to move the operating point of the engine 3 from the point c to a point b1 on a low torque side or a point b2 on a high torque side along an equal rotation speed line Lr. A difference from the required drive force caused by the movement of the operating point of the engine 3 is compensated with the motor torque of the second motor-generator 5, and thus the motor torque can be deviated from the rich spike prohibition range AR. Similarly to the pattern A, in order to prevent the motor torque of the second motor-generator 5 from crossing a zero point, whether to move the operating point to either the point b1 or the point b2 is selected in the pattern B in accordance with the positive or negative motor torque at the point c before the movement. In other words, when the motor torque is greater than or equal to zero at the point c (in the case of positive motor torque), the operating point is moved to the point b1, and when the motor torque is smaller than zero at the point c (in the case of negative motor torque), the operating point is moved to the point b2.

The pattern B does not involve the fluctuation of the engine speed, and thus the pattern B can achieve the deviation of the motor torque of the second motor-generator 5 from the rich spike prohibition range AR without providing discomfort to the user. However, the operating point of the engine 3 deviates from the normal line L, and thus the fuel efficiency may deteriorate according to the pattern B. Additionally, the second motor-generator 5 cancels the increased or decreased torque that is directly transferred from the engine 3, and thus the pattern B involves the change in the electric storage rate of the battery 16.

As shown in FIG. 6C, the pattern C is to change the operating point of the engine 3 on an equal power line Lp. In other words, the pattern C is to move the operating point of the engine 3 from the point c to a point b1 on a low torque and high engine speed side or a point b2 on a high torque and low engine speed side along the equal power line Lp. A difference from the required drive force caused by the movement of the operating point of the engine 3 is compensated with the motor torque of the second motor-generator 5, and thus the motor torque can be deviated from the rich spike prohibition range AR. Similarly to the pattern A and the pattern B, in order to prevent the motor torque of the second motor-generator 5 from crossing a zero point, whether to move the operating point to either the point b1 or the point b2 is selected in the pattern C in accordance with the positive or negative motor torque at the point c before the movement. In other words, when the motor torque is greater than or equal to zero at the point c (in the case of positive motor torque), the operating point is moved to the point b1, and when the motor torque is smaller than zero at the point c (in the case of negative motor torque), the operating point is moved to the point b2.

The pattern C can achieve the deviation of the motor torque of the second motor-generator 5 from the rich spike prohibition range AR without the change in the electric storage rate of the battery 16. However, the pattern C involves the fluctuation of the engine speed, and thus the pattern C may provide discomfort to the user. Additionally, the operating point of the engine 3 deviates from the normal line L, and thus the fuel efficiency may deteriorate according to the pattern C.

Figure 7:
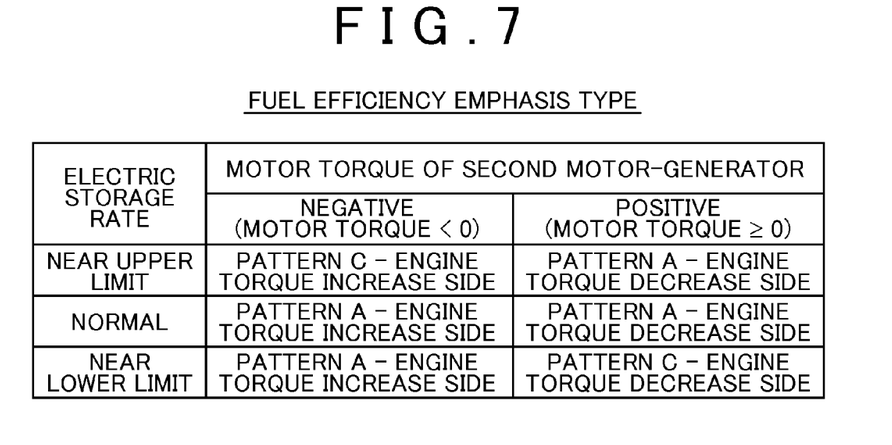
FIG. 7 is a table that shows a changing operation with emphasis on fuel efficiency in the patterns for changing the operating point of the engine according to the second embodiment of the present invention.
Figure 8:
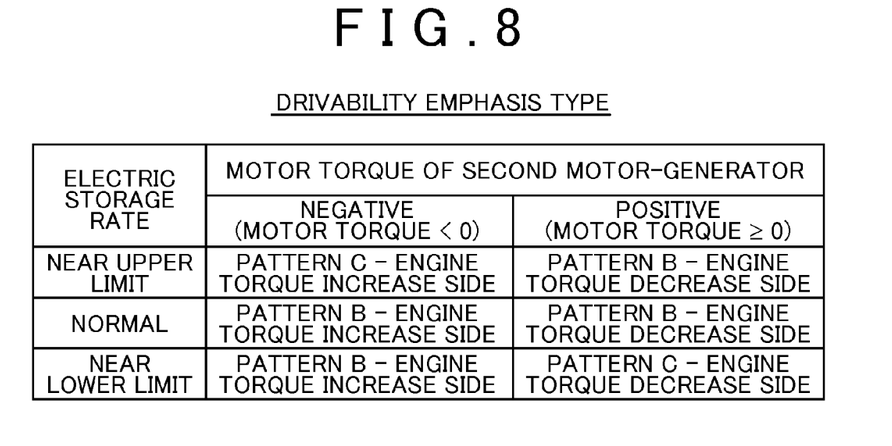
FIG. 8 is a table that shows a changing operation with emphasis on drivability in the patterns for changing the operating point of the engine according to the second embodiment of the present invention.

As described above, each of the pattern A through C has advantages and disadvantages. Thus, in the second embodiment according to the present invention, deficiency and excess of the electric storage rate of the battery 16 are prevented by changing the patterns in terms of the electric storage rate of the battery 16 and the sign, positive or negative, of the motor torque of the second motor-generator 5. Furthermore, a changing operation of changing the patterns are made to be different in the case where the fuel efficiency is demanded and in the case where the drivability is demanded, that is, where the discomfort is not desired to be provided to the user. The operation of changing the patterns A through C are made as shown in FIG. 7 and FIG. 8. As shown in the drawings, the electric storage rate of the battery is divided into three ranges that are near upper limit, normal, and near lower limit. The pattern to be selected is assigned to each range in the cases of the positive and negative motor torque. The operation shown in FIG. 7 is selected with emphasis on the fuel efficiency, and the operation shown in FIG. 8 is selected with emphasis on the drivability.

The ECU 30 possesses tables that include data structures shown in FIG. 7 and FIG. 8. The user hardly feels the discomfort as the accelerator operation amount is large, and thus the ECU 30 uses, for example, the table corresponding to FIG. 7 when the accelerator operation amount is larger than the threshold and the table corresponding to FIG. 8 when the accelerator operation amount is smaller than the threshold. When the ECU 30 executes the step S21 shown in FIG. 5, the ECU 30 selects the pattern suitable for the electric storage rate of the battery 16 and the positive or negative motor torque and changes the operating point of the engine 3 in accordance with the selected pattern.

It is to be understood that the invention is not limited to the embodiments described above and various embodiments can be carried out within the scope of the invention. In the embodiment described above, the deviation of the motor torque of the second motor-generator 5 from the rich spike prohibition range including 0 Nm torque is determined as one requirement, and the ECU 30 set the specified condition so that the rich spike operation is easier to execute as the motor torque of the second motor-generator 5 increases. However, this is merely one example of the specified condition. For example, the specified condition may be determined so that the rich spike operation is easily executed in a case of large magnitude of the motor torque in comparison with a case of small magnitude by setting the threshold of the NOx concentration to be greater value in the case of large magnitude of the motor torque in comparison with the case of small magnitude.

What is claimed is:

1. A control apparatus for a hybrid vehicle, the control apparatus comprising:
    an engine configured to change a combustion air-fuel ratio;
    an exhaust gas purification catalyst configured to absorb and reduce nitrogen oxides in exhaust gas of the engine;
    a first motor-generator;
    an output section configured to transfer torque from the engine to driving wheels of the hybrid vehicle;
    a differential mechanism configured to distribute the torque from the engine to the first motor generator and the output section;
    a second motor-generator connected to the output section through gears;
    a controller configured to:
    execute a temporarily changing of the combustion air-fuel ratio of the engine to a rich side as a rich spike operation when a specified condition is determined to be satisfied and restrict temporarily changing the combustion air-fuel ratio of the engine to a rich side as a rich spike operation when a first condition, of the specified condition, is determined to not be satisfied, wherein
    the specified condition includes:
    the first condition that a motor torque of the second motor-generator deviates from a rich spike prohibition torque range including 0 Nm torque; and
    a second condition that a nitrogen oxide concentration of the exhaust gas purification catalyst exceeds a threshold which is smaller than an upper allowable limit value of a nitrogen oxide concentration for the exhaust purification catalyst.

2. The control apparatus according to claim 1, further comprising a battery electrically connected to the second motor-generator, wherein
    the controller is further configured to change a pattern for changing an operating point of the engine in accordance with an electric storage rate of the battery and a sign, positive or negative, of the motor torque of the second motor-generator.

* * * * *